United States Patent
Doyle et al.

(10) Patent No.: US 7,134,012 B2
(45) Date of Patent: Nov. 7, 2006

(54) METHODS, SYSTEMS AND COMPUTER PROGRAM PRODUCTS FOR DETECTING A SPOOFED SOURCE ADDRESS IN IP DATAGRAMS

(75) Inventors: Ronald P. Doyle, Raleigh, NC (US); John R. Hind, Raleigh, NC (US); Thomas Narten, Durham, NC (US); Marcia L. Peters, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 993 days.

(21) Appl. No.: 09/930,351

(22) Filed: Aug. 15, 2001

(65) Prior Publication Data
US 2003/0043853 A1      Mar. 6, 2003

(51) Int. Cl.
*H04L 9/00* (2006.01)
*H04L 12/56* (2006.01)

(52) U.S. Cl. .................. 713/151; 370/395.54; 713/152

(58) Field of Classification Search ........ 709/220–240; 370/389–405; 455/428; 380/49, 21; 713/150–4, 713/150–154
See application file for complete search history.

(56) References Cited

U.S. PATENT DOCUMENTS

| | | | | |
|---|---|---|---|---|
| 5,757,924 A | * | 5/1998 | Friedman et al. ........... | 713/151 |
| 5,884,024 A | * | 3/1999 | Lim et al. .................... | 713/201 |
| 5,935,245 A | * | 8/1999 | Sherer ......................... | 713/200 |
| 6,009,103 A | * | 12/1999 | Woundy ...................... | 370/401 |
| 6,073,178 A | * | 6/2000 | Wong et al. ................. | 709/229 |
| 6,182,226 B1 | * | 1/2001 | Reid et al. ................... | 713/201 |
| 6,289,377 B1 | * | 9/2001 | Lalwaney et al. ........... | 709/222 |
| 6,442,144 B1 | * | 8/2002 | Hansen et al. ............... | 370/255 |
| 6,466,986 B1 | * | 10/2002 | Sawyer et al. .............. | 709/245 |
| 6,496,935 B1 | * | 12/2002 | Fink et al. ................... | 713/201 |
| 6,618,398 B1 | * | 9/2003 | Marchetti et al. ........... | 370/475 |
| 6,754,716 B1 | * | 6/2004 | Sharma et al. .............. | 709/238 |
| 2002/0013844 A1 | * | 1/2002 | Garrett et al. .............. | 709/225 |

OTHER PUBLICATIONS

Comer, Douglas, "Internetworking with TCP/IP vol. 1," 1995, 3rd Ed., Prentice-Hall, Inc., pp. 73-81.*
Doeppner, et al., "Using Router Stamping to Identify the Source of IP Packets", 2000, ACM, pp. 184-189.*
David C. Plummer, *An Ethernet Address Resolution Protocol.* Network Working Group Request for Comments 826, Nov. 1982.
Jon Postel (Editor), *Internet Protocol.* Request for Comments 791, Sep. 1981.
CERT® *Advisory CA-1996-21 TCP SYN Flooding and IP Spoofing Attacks.* http//www.cert.org/advisories/CA-1996-21.html.

(Continued)

*Primary Examiner*—Jacques Louis-Jacques
*Assistant Examiner*—William S. Powers
(74) *Attorney, Agent, or Firm*—Myers Bigel Sibley & Sajovec, P.A.

(57) ABSTRACT

Methods, systems and computer program products are provided for determining if a packet has a spoofed source Internet Protocol (IP) address. A source media access control (MAC) address of the packet and the source IP address are evaluated to determine if the source IP address of the packet has been bound to the source MAC address at a source device of the packet. The packet is determined to have a spoofed source IP address if the evaluation indicates that the source IP address is not bound to the source MAC address. Such an evaluation may be made for packets having a subnet of the source IP address which matches a subnet from which the packet originated.

23 Claims, 11 Drawing Sheets

OTHER PUBLICATIONS

Farrow, Rik, "Source Address Spoofing," *Network Magazine*, May 1, 2000.

Farrow, Rik, "Source Address Spoofing," Microsoft TechNet Security, 2000.

Ferguson et al. RFC2267, Network Ingress Filtering: Defeating Denial of Service Attachs which employ IP Source Address Spooofing, www.ietf.org/rfc/rfc2267.txt.

* cited by examiner

METHODS, SYSTEMS AND COMPUTER PROGRAM PRODUCTS FOR DETECTING A SPOOFED SOURCE ADDRESS IN IP DATAGRAMS

FIELD OF THE INVENTION

The present invention relates to network communications and more particularly to network communications utilizing the Internet Protocol (IP).

BACKGROUND OF THE INVENTION

As the popularity and use of the Internet has grown, so has the potential for the spread of malicious programs, such as computer viruses. One such type of malicious program performs a denial of service a (DOS) attack. A DOS attack attempts to degrade performance of a server, website or the like through overutilization. A large number of requests are sent to the website which may overwhelm the website's ability to respond to requests and utilize the processing capabilities and bandwidth of the website to respond to the malicious requests. Furthermore, if such viruses infect a large enough group of computers, performance degradation may be seen over parts of or the entire Internet as communication bandwidth is tied up performing the malicious requests.

Recently, the Internet has experienced several DOS attacks from "zombie" computers controlled by the viruses creator(s) (i.e. hackers). A zombie computer is a computer which, unbeknownst to the computer's user, generates the requests for the DOS attack. The systems most likely to be added to a hacker's "zombie" stable, often by infection with a Trojan horse virus or worm virus injected by unfiltered email or web usage, are personal computers running consumer versions of Windows (e.g., 95, 98, Millennium), because of the unsophistication of their users and the large number of such systems. Fortunately, however, Microsoft's TCP/IP stack implementation on these consumer operating systems contained a restriction that prevented application software from spoofing the source IP address (SA) of transmissions (i.e. from using a source address of a transmission which was different from the IP address assigned to the system). This restriction made it relatively easy for the target of a DOS attack to identify the source of offending transmissions and establish router filters to block that address. Once identified, the system user/administrator could work with the ISP or enterprise owning the source address range to clean up the infected "zombie."

In contrast, enterprise-class operating systems, such as Windows NT and 2000, Unix and Linux, implement the TCP/IP specification more accurately, making it possible for applications on these platforms to spoof source IP addresses in transmissions. However, Microsoft's Windows XP, a new consumer version, removes the earlier stack restriction and, hence, allows applications to spoof SAs. The release and proliferation of Windows XP is, therefore, expected to result in a large population of machines that, once infected with Trojan viruses, can easily become zombies capable of spoofing source IP addresses. The targets of DOS attacks will then find it difficult to block the transmissions (since they may appear to come from a large variety of SAs) or to identify and clean up the zombie machines (since machines that falsify their IP address are, typically, hard to track down).

As spoofed SAs have been used in previous DOS attacks (generally originating from Unix/Linux and NT machines), the industry has adopted a "best practice" of adding filters to endpoint ("leaf") routers to prevent packets with forged subnet addresses from entering the Internet; i.e., the subnet of a source IP address must match the subnet from which the packet originates, or the router's filter will cause the packet to be discarded. When this practice is used, it enables identification of the subnet where an attack originates. The specific computer originating the attack can be identified if the proper monitoring equipment (e.g. network analyzers, sniffers) is deployed at the time of the attack and if the ISP/enterprise is willing to spend the money and time for the analysis.

Unfortunately, filtering for forged subnet address at leaf routers, typically, does not prevent spoofing of a forged address that has a valid subnet identification. A subnet often has a large pool of unassigned addresses that can easily be appropriated by hackers. Furthermore, filtering at the leaf routers may fail to cover network topologies where multiple routers and endpoints share a subnet.

SUMMARY OF THE INVENTION

Embodiments of the present invention provide methods, systems and computer program products for determining if a packet has a spoofed source Internet Protocol (IP) address. A source media access control (MAC) address of the packet and the source IP address are evaluated to determine if the source IP address of the packet has been bound to the source MAC address at a source device of the packet. The packet is determined to have a spoofed source IP address if the evaluation indicates that the source IP address is not bound to the source MAC address. Such an evaluation may be made for packets having a subnet of the source IP address which matches a subnet from which the packet originated.

In particular embodiments of the present invention, the packet is discarded if it is determined that the packet has a spoofed source IP address. Furthermore, the packet may be discarded if the MAC address has associated with it more than a predefined number of IP addresses. The predefined number of IP addresses may be associated with the source device or associated with a subnet associated with the MAC address. Furthermore, the packet may be discarded if the source IP address is associated with at least one MAC address other than the source MAC address. Additionally, the packet may be forwarded if the source IP address indicates that the packet is a dynamic host configuration protocol (DHCP) request. Such a determination may be made by determining if the source IP address indicates that the packet is a dynamic host configuration protocol (DHCP) request and/or the contents of the packet indicate that the packet is a DHCP request.

In further embodiments of the present invention, the packet is determined to have a spoofed source IP address if the address evaluation indicates that the source IP address is not bound to the source MAC address and the source MAC address is not associated with a gateway routing device. Furthermore, it may be determined if the source MAC address is identified in an address resolution protocol (ARP) table as a MAC address of a routing device to determine if the source MAC address is not associated with a gateway routing device. Such a determination may be made by determining if an IP address of a gateway address device is to be added to the routing table and sending an ARP request to the IP address of the gateway routing device. A response to the ARP request is received that identifies a MAC address of the gateway routing device and the ARP table updated with the MAC address of the gateway routing device. The MAC address in the ARP table is also identified as associated with a gateway routing device.

Alternatively, IP addresses associated with the source MAC address in an address resolution protocol (ARP) table are identified. It is then determined if the IP addresses associated with the source MAC address in the ARP table are associated with a gateway routing device to determine if the source MAC address is not associated with a gateway routing device. In such embodiments, the determination of whether the IP addresses associated with the source MAC address in the ARP table are associated with a gateway routing device may be provided by searching a routing table for the IP addresses to determine if any of the IP addresses are associated with a gateway routing device in the routing table.

In still further embodiments of the present invention, the evaluation of the source IP address and the source MAC address includes determining if an address resolution protocol (ARP) table entry indicates that the source MAC address is associated with the source IP address. In such embodiments, such a determination may be made by identifying an entry in the ARP table corresponding to the source MAC address, comparing an IP address of the identified entry to determine if the IP address of the entry corresponds to the source IP address and identifying the source IP address as bound to the source MAC address at the source device if the IP address of the identified entry corresponds to the source IP address.

Furthermore, an ARP request may be sent to the source IP address if no entry in the ARP table is identified as corresponding to the source MAC address. An entry corresponding to the MAC address may be incorporated into the ARP table if a response is received to the ARP request. The source IP address may be identified as not bound to the source MAC address if a response is not received to the ARP request.

In particular embodiments of the present invention, the packet is discarded if no entry in the ARP table corresponding to the MAC address has an IP address which corresponds to the source IP address. Additionally, it may be determined if the source IP address is associated with a routing device and the packet may be forwarded if the source IP address is associated with a routing device. The packet may be discarded if no entry in the ARP table corresponding to the MAC address has an IP address which corresponds to the source IP address.

In still further embodiments of the present invention, it is determined if a packet having the source IP address has previously been received. The packet may be forwarded if a packet having the source IP address has not been received previously. In such embodiments, an ARP request may be sent to the source IP address if a packet having the source IP address has not been received previously. An entry corresponding to the MAC address may be incorporated into the ARP table if a response is received to the ARP request. Furthermore, the determination of whether an ARP table entry indicates that the source MAC address is associated with the source IP address may be provided by identifying an entry in the ARP table corresponding to the source MAC address, comparing an IP address of the identified entry to the source address to determine if the IP address of the identified entry corresponds to the source IP address and identifying the source IP address as bound to the source MAC address at the source device if the IP address of the identified entry corresponds to the source IP address. The packet may be discarded if no entry in the ARP table corresponding to the MAC address has an IP address which corresponds to the source IP address.

In additional embodiments of the present invention, systems, methods, computer program products and methods of doing business are provided by monitoring packets to determine if a source IP address of the packet is bound to a source MAC address of the packet at a source device of the packet so as to determine if the source IP address of the packet has been spoofed. Packets having a spoofed source IP address as such so as to allow corrective action to be taken to reduce network degradation as a result of a denial of service attack utilizing spoofed source IP addresses.

In such embodiments, the corrective action may be discarding the packet if the source IP address of the packet has been spoofed, logging MAC addresses of packets with spoofed source IP addresses and/or notifying a system administrator of the subnet of the source device of the presence of a spoofed source IP address in a packet from the source device. Furthermore, the destination device of the packet may be a network attached storage device and the corrective action may include discarding the packet before the packet is forwarded to the network attached storage devices so as to increase the availability of the network attached storage device in the event of a denial of service attack.

As will further be appreciated by those of skill in the art, while described above primarily with reference to method aspects, the present invention may be embodied as methods, apparatus/systems and/or computer program products.

DETAILED DESCRIPTION OF THE INVENTION

Figure 1:
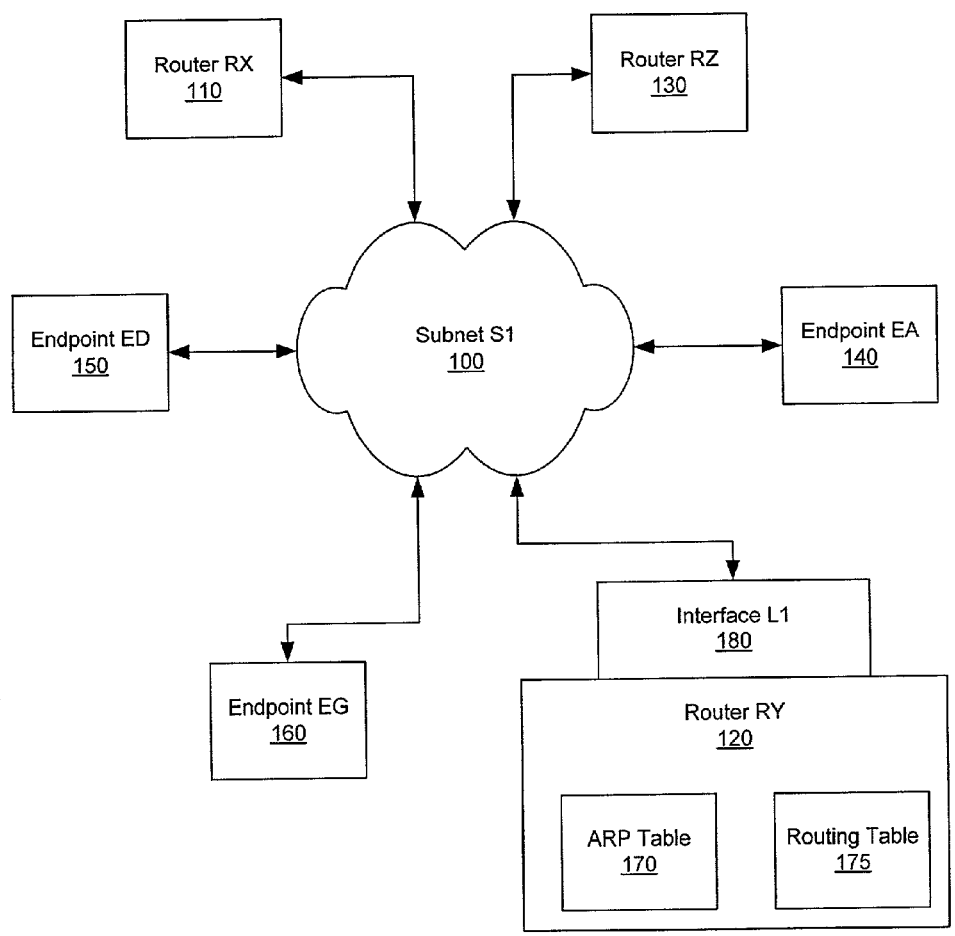
FIG. 1 is a block diagram illustrating a system incorporating embodiments of the present invention.

The present invention now will be described more fully hereinafter with reference to the accompanying drawings, in which illustrative embodiments of the invention are shown.

This invention may, however, be embodied in many different forms and should not be construed as limited to the embodiments set forth herein; rather, these embodiments are provided so that this disclosure will be thorough and complete, and will fully convey the scope of the invention to those skilled in the art. Like numerals refer to like elements throughout.

As will be appreciated by one of skill in the art, the present invention may be embodied as a method, data processing system, or computer program product. Accordingly, the present invention may take the form of an entirely hardware embodiment, an entirely software embodiment or an embodiment combining software and hardware aspects all generally referred to herein as a "circuit" or "module." Furthermore, the present invention may take the form of a computer program product on a computer-usable storage medium having computer-usable program code embodied in the medium. Any suitable computer readable medium may be utilized including hard disks, CD-ROMs, optical storage devices, a transmission media such as those supporting the Internet or an intranet, or magnetic storage devices.

Computer program code for carrying out operations of the present invention may be written in an object oriented programming language such as Java®, Smalltalk or C++. However, the computer program code for carrying out operations of the present invention may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Various embodiments of the present invention will now be described with reference to the figures. As will be appreciated by those of skill in the art, embodiments of the present invention may provide for detecting if a source Internet Protocol (IP) address of a datagram or packet has been spoofed. Such a determination may form the basis for taking corrective action by discarding spoofed packets or for monitoring network activity to detect such spoofed packets SO that an administrator may be notified so as to allow corrective action to be taken. As described herein, according to embodiments of the present invention, a source IP address of a packet may, in general, be considered spoofed if it is determined that the source IP address of the packet is not bound to the media access control (MAC) address at the source device of the packet. Operations for making such a determination, as well as further operations that may reduce network degradation from spoofed source IP address, such as those generated in a denial of service attack, are illustrated in FIGS. 1 through 11.

FIG. 1 illustrates a network configuration incorporating embodiments of the present invention as part of a filtering device, such as the router RY 120, where packet filtering may be performed. As seen in FIG. 1, network subnet S1 100 includes endpoint devices, such as the endpoint EA 140, the endpoint ED 150, and the endpoint EG 160, and routing devices, such as the router RX 110, the router RY 120 and the router RZ 130. The routing devices 110, 120 and 130 are typically configured to function as gateways to/from the subnet S1 100 to/from other subnets (not shown). Typically, the routing devices 110, 120 and 130 will have one or more interfaces to the subnet S1 100 and one or more interfaces to another subnet. Thus, as illustrated in FIG. 1, the router 120 has an interface L1 180 to the subnet S1 100. Furthermore, the routing devices 110, 120,130 according to embodiments of the present invention include a routing table 175 which identifies, among other things, which IP addresses are associated with gateway routing devices which provide a gateway to other network subnets. The routing devices 110, 120 and 130 also include an address resolution protocol (ARP) table 170 which, among other things, identifies which IP addresses are associated with which physical address (e.g. MAC address) on the subnet S1 100.

For purposes of illustration, Table 1 illustrates a portion of an exemplary routing table 175 having entries which identify gateway routing devices:

Table 1. Routing Table

| Subnet | Gateway IP Address |
|--------|--------------------|
| S1     | S1.RY              |
| S2     | S1.RX              |
| S4     | S1.RX              |

In the above example, S1, S2, and S4 identify different subnets and RY and RX are addresses of the routing devices 120 and 110 respectively.

Similarly, Table 2 illustrates a portion of an ARP table 170 for the router RY 120 which identifies the physical address and IP address for devices communicating through the interface L1 180. Thus, for example, a portion of the ARP table may be as follows:

Table 2. ARP Table for S1.RY on Interface L1

| IP Address | Physical (MAC) Address |
|---|---|
| S1.EG | 00-20-35-86-6f-83 |
| S1.RX | 40-00-49-25-38-01 |

In the above example, S1.EG is the IP address of the endpoint EG 160 and S1.RX is the IP address of the routing device RX 110.

Figure 2:
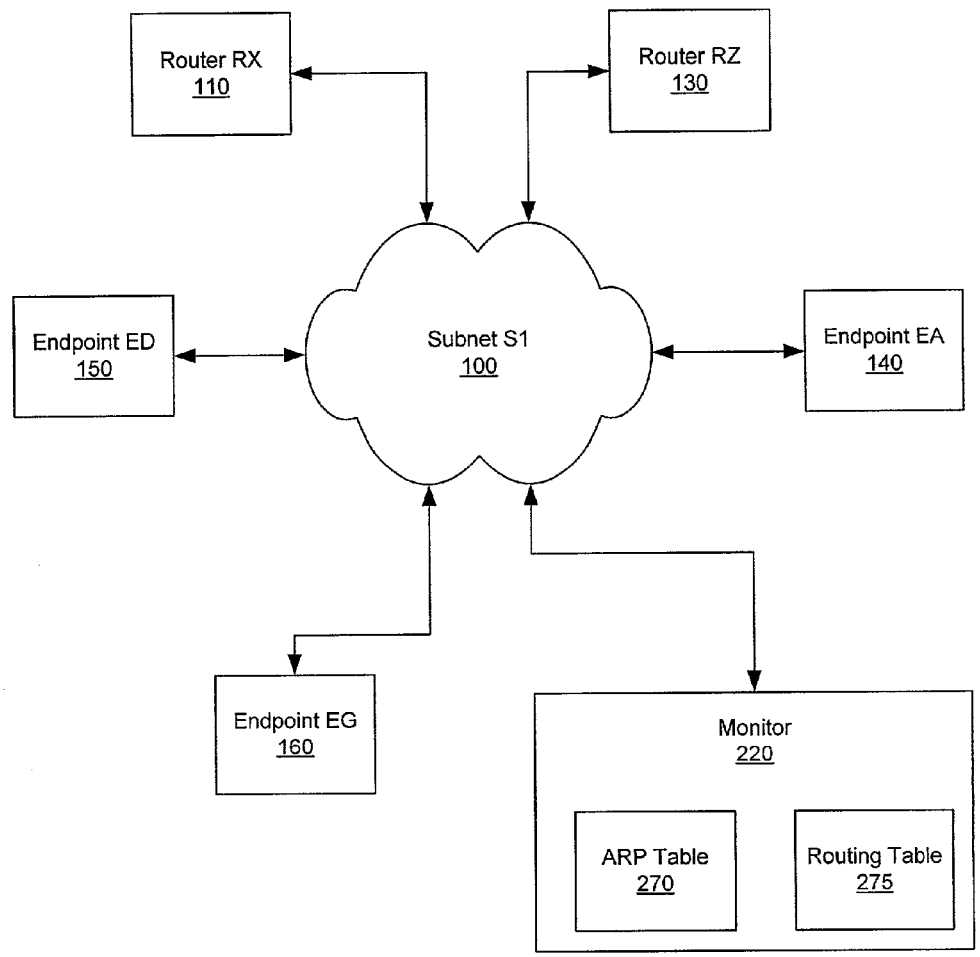
FIG. 2 is a block diagram illustrating a system incorporating alternative embodiments of the present invention.

FIG. 2 illustrates embodiments of the present invention in a monitoring device, such as the monitor 220. As seen in FIG. 2, the monitor 220 may also include an ARP table 270 and a routing table 275. In the embodiments illustrated in FIG. 2, the monitor 220 may monitor the packets transmitted on the subnet S1 100 irrespective of whether they are directed to the monitor 220 and determine if a packet has a spoofed source IP address as described herein. Such detection may be logged and/or an administrator notified of the occurrence of the spoofed source IP address.

In the networks illustrated in FIGS. 1 and 2, the endpoints 140, 150 and 160 may be any network attachable device, such as a workstation, server, network attached storage device or the like. Furthermore, the routing devices 110, 120 and 130 may be any device capable of providing a gateway to another subnet and of carrying out the operations as described herein. The monitor 220 may be any device which may receive packets from a network subnet and carry out the operations described herein to evaluate such packets.

Figure 3:
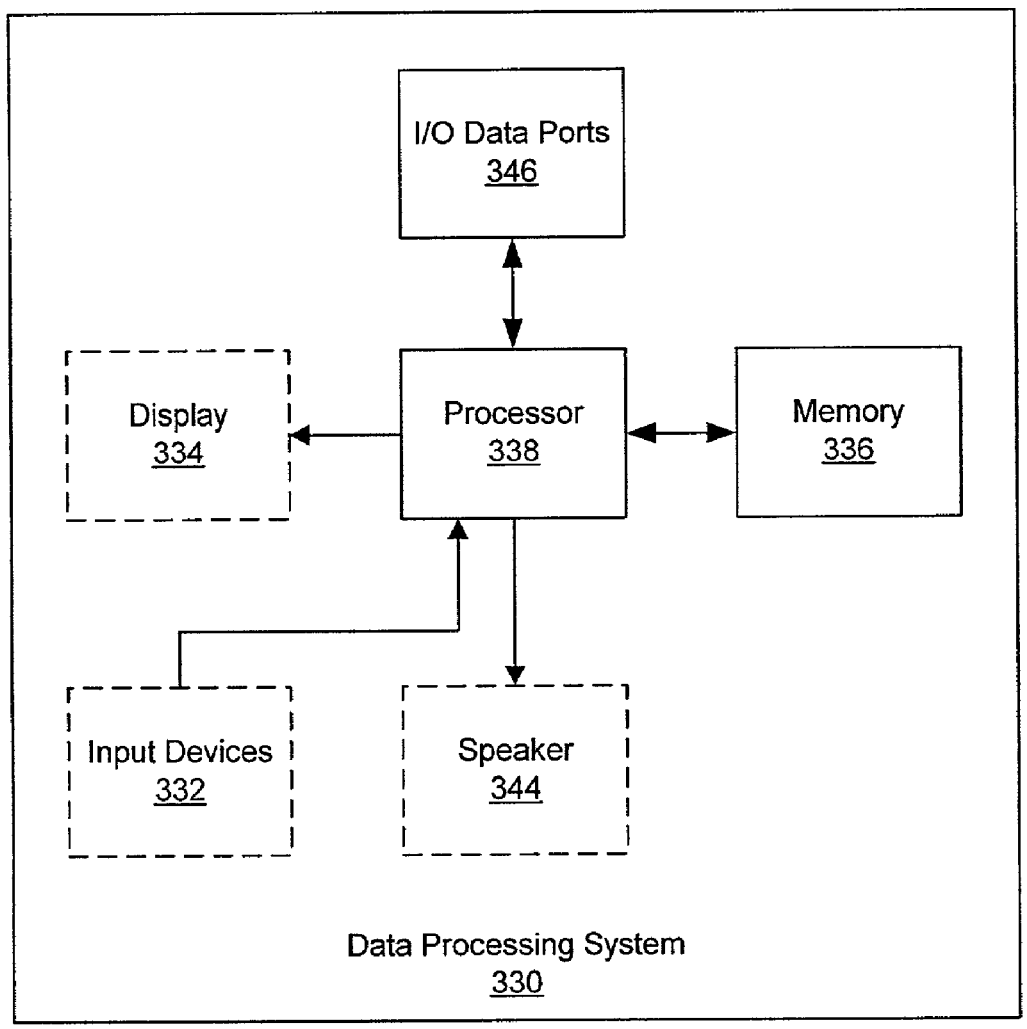
FIG. 3 is a block diagram of a data processing system suitable for use in embodiments of the present invention.

FIG. 3 illustrates an exemplary embodiment of a data processing system 330 suitable for providing a filtering device, such as the routing device 120 or a monitor 220 in accordance with embodiments of the present invention. The data processing system 330 typically includes a memory 336 that communicate with a processor 338. The data processing system 330 may, optionally, include input device(s) 332 such as a keyboard or keypad, and a display 334 (illustrated in dashed lines) that also communicate with the processor 338. The data processing system 330 may further include optional devices such as a speaker 344, and an I/O data port(s) 346 that also communicate with the processor 338. The I/O data ports 346 can be used to transfer information between the data processing system 330 and another computer system or a network. These components may be conventional components such as those used in many conventional data processing systems which may be configured to operate as described herein.

Figure 4:
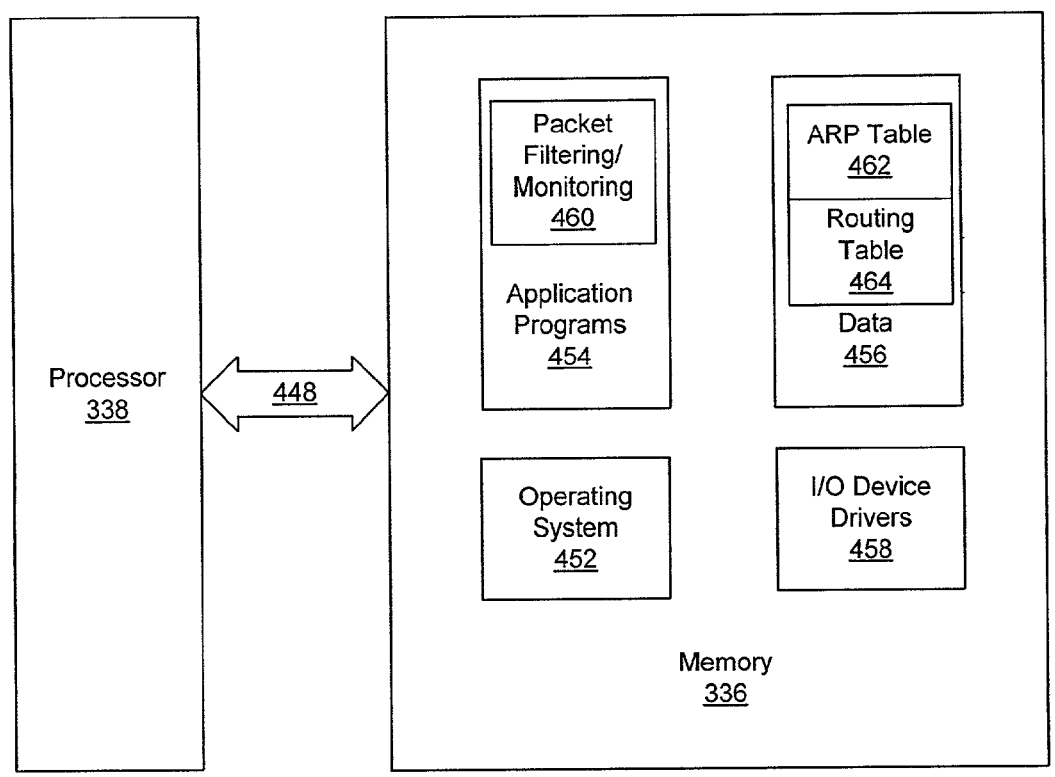
FIG. 4 is a more detailed block diagram of a data processing systems according to embodiments of the present invention.

FIG. 4 is a block diagram of data processing systems that illustrates systems, methods, and computer program products in accordance with embodiments of the present invention. The processor 338 communicates with the memory 336 via an address/data bus 448. The processor 338 can be any commercially available or custom microprocessor. The memory 336 is representative of the overall hierarchy of memory devices containing the software and data used to implement the functionality of the data processing system 330. The memory 336 can include, but is not limited to, the following types of devices: cache, ROM, PROM, EPROM, EEPROM, flash memory, SRAM, and DRAM.

As shown in FIG. 4, the memory 336 may include several categories of software and data used in the data processing system 330: the operating system 452; the application programs 454; the input/output (I/O) device drivers 458; and the data 456. As will be appreciated by those of skill in the art, the operating system 452 may be any operating system suitable for use with a data processing system, such as OS/2, AIX or System390 from International Business Machines Corporation, Armonk, N.Y., Windows95, Windows98 or Windows2000 from Microsoft Corporation, Redmond, Wash., Unix or Linux configured to support a TCP/IP-based protocol connection. The I/O device drivers 458 typically include software routines accessed through the operating system 452 by the application programs 454 to communicate with devices such as the I/O data port(s) 346 and certain memory 336 components. The application programs 454 are illustrative of the programs that implement the various features of the data processing system 330 and preferably include at least one application which supports operations according to embodiments of the present invention. Finally, the data 456 represents the static and dynamic data used by the application programs 454, the operating system 452, the I/O device drivers 458, and other software programs that may reside in the memory 336.

As is further seen in FIG. 4, the application programs 454 may include a packet filtering/monitoring module 460. The packet filtering/monitoring module 460 carries out operations as described herein related to the monitoring and/or filtering of packets to detect and/or discard packets with spoofed source IP addresses. The packet filtering/monitoring module 460 may operate in coordination with the operating system 452 and the I/O device drivers 458 to support establishing a connection through the I/O data ports 346 over which IP packets are received for evaluation as described herein.

The data portion 456 of memory 336, as shown in the embodiments of FIG. 4, may include an Address Resolution Protocol (ARP) table 462 and a routing table 464. The ARP table 462 includes information which associates an IP address of an interface of a device with a Media Access Control (MAC) address of the interface. Thus, the ARP table 462 establishes a relationship between layer 2 addresses and IP addresses. The routing table 464, in various embodiments of the present invention, contains the routing paths for packets. The routing table 464, typically, indicates which devices are routing devices which provide a gateway to one or more subnets.

While the present invention is illustrated, for example, with reference to the packet filtering/monitoring module 460 being an application program in FIG. 4, as will be appreciated by those of skill in the art, other configurations may also be utilized while still benefiting from the teachings of the present invention. For example, the packet filtering/monitoring module 460 may also be incorporated into the operating system 452, the I/O device drivers 458 or other such logical division of the data processing system 330. Thus, the present invention should not be construed as limited to the configuration of FIG. 4 but is intended to encompass any configuration capable of carrying out the operations described herein.

As briefly described above, embodiments of the present invention provide for a determination of whether a packet has a spoofed source IP address based on whether the source IP address of the packet is bound to the MAC address of the source device. Such a determination may be made by consulting the ARP table 170, 270, 462 to determine if the source IP address is associated with the MAC address of the packet in the ARP table 170, 270, 462. If no entry in the ARP table 170, 270, 462 exists for the IP address, an ARP request can be sent to the IP address and an entry placed in the ARP table 170, 270, 462. If the returned MAC address does not correspond to the source MAC address of the packet, it is possible that the source IP address has been spoofed. Such may not be the case, however, if the packet was received from a routing device. In such a case, the packet may not be considered as having a spoofed source IP address. The identity of routing devices may be determined by consulting the routing table 175, 275 or by identifying MAC addresses of routing devices in the ARP table 170, 270, 462.

Figure 5:
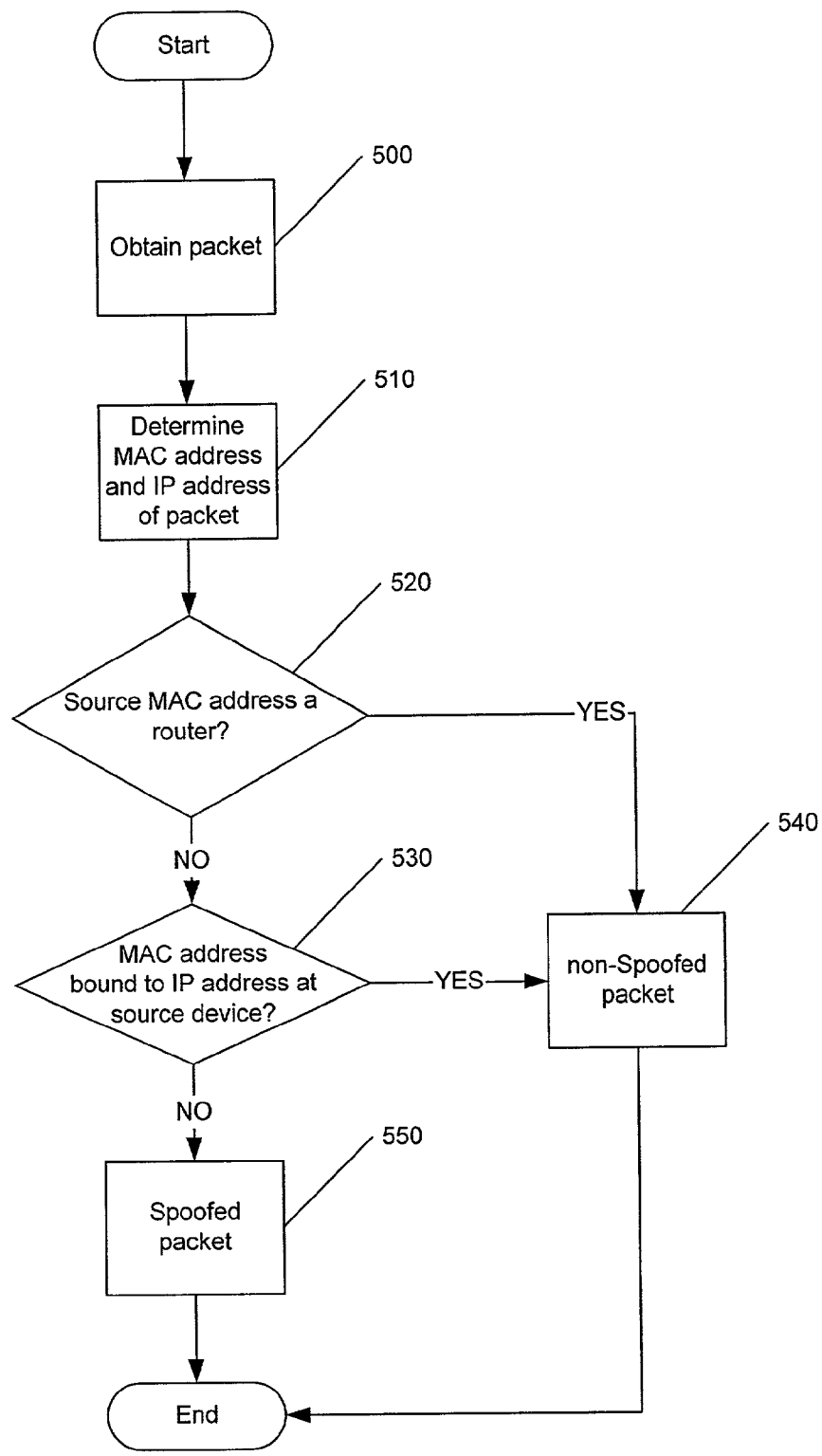
FIG. 5 is a flowchart illustrating operations according to embodiments of the present invention.

Operations according to embodiments of the present invention will now be described in further detail with reference to the flowchart illustrates of FIGS. 5 through 11. As seen in FIG. 5, a packet is obtained (block 500) and the source MAC address and source IP address determined from the IP header of the packet (block 510). The packet may be obtained by the router RY 120 receiving the packet from the subnet S1 100 or the monitor 220, where the monitor 220 may "sniff" the subnet S1 100 for packets.

In any event, it is determined if the source MAC address for the packet is a physical address of a router (block 520). If the source MAC address is the physical address of a router (block 520), the packet is identified as a non-spoofed packet (block 540). If the source MAC address is not the physical address of a router (block 520), it is determined if the MAC address is bound to the source IP address of the packet at the source device (block 530). If the MAC address is bound to the source IP address of the packet at the source device (block 530), the packet is identified as a non-spoofed packet (block 540). If the MAC address is not bound to the source IP address of the packet at the source device (block 530), the packet is identified as a spoofed packet (block 550).

Figure 6:
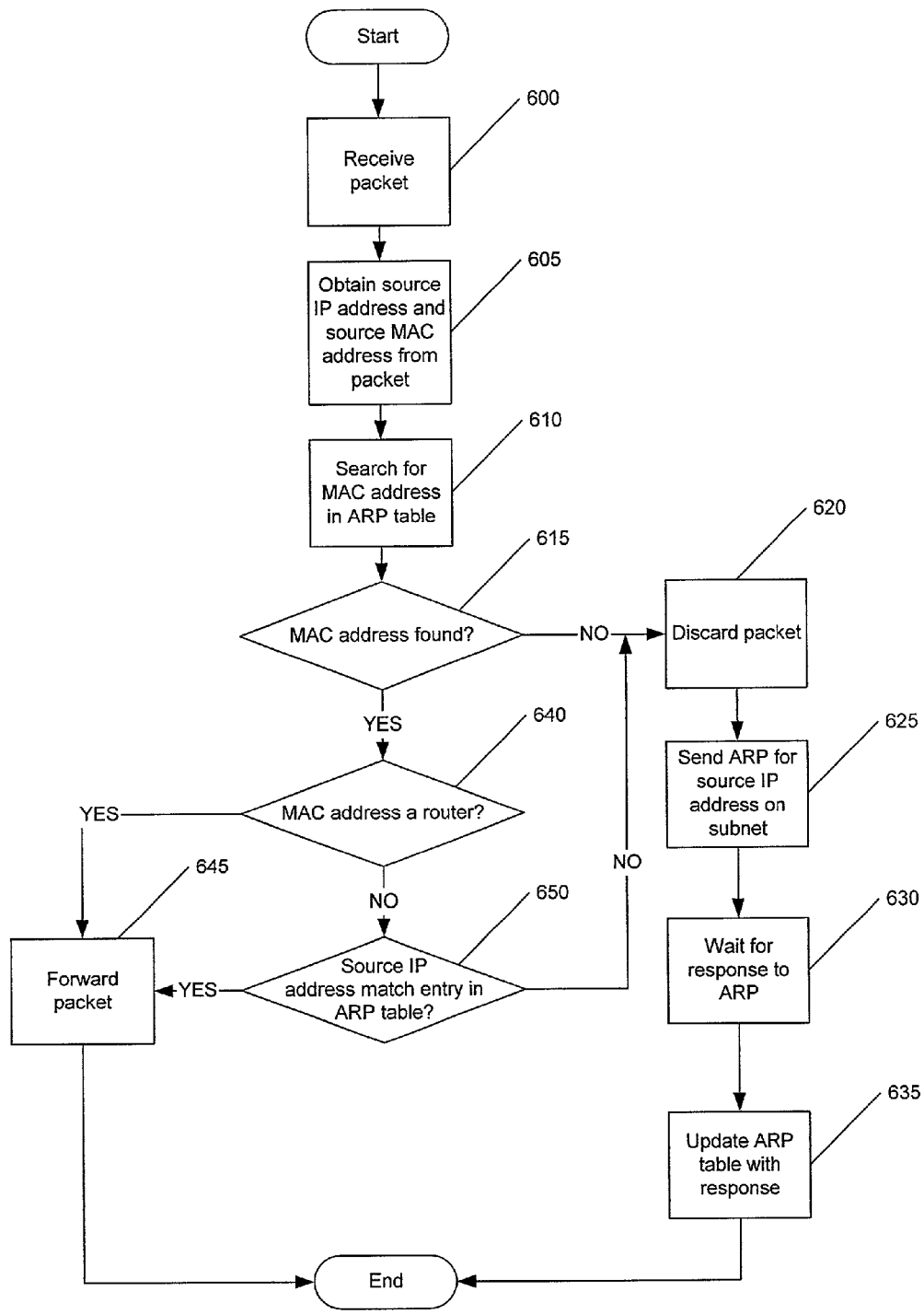
FIG. 6 is a flowchart illustrating operations of a filtering device according to embodiments of the present invention.

FIG. 6 illustrates operations according to further embodiments of the present invention which filter the received packets. As seen in FIG. 6, a packet is received at a filtering device, such as the router RY 120 (block 600) and the source IP address and the source MAC address are obtained from the received packet (block 605). The ARP table 170 is searched for entries corresponding to the source MAC address (block 610). If no entry is found in the ARP table 170 which correspond to the source MAC address (block 615), the packet is discarded (block 620). An ARP request is sent to the source IP address (block 625) and the routing device waits for a response (block 630). If a response is received, the ARP table 170 table is updated with the IP address and the MAC address from the response (block 635).

Returning to block 615, if an entry or entries are found in the ARP table 170 corresponding to the source MAC address, it is determined if the MAC address is the physical address of a router (block 640). If the MAC address is the physical address of a router (block 640), the packet is forwarded (block 645). If the MAC address is not the physical address of a router (block 640), it is determined if the source IP address matches an entry in the ARP table 170 corresponding to the source MAC address (block 650). If the source IP address matches an entry in the ARP table 170 corresponding to the source MAC address (block 650), the packet is forwarded (block 645). If the source IP address does not match an IP address of entry in the ARP table 170 corresponding to the source MAC address (block 650), the packet is discarded (block 620) and, if the source IP address corresponds to a subnet associated with the routing device, an ARP request is sent to the source IP address on the appropriate subnet (block 625) and the routing device waits for a response (block 630). If a response is received the ARP table is updated with the IP address and the MAC address (block 635).

In the embodiment illustrated in FIG. 6, packets without entries in the ARP table 170 are discarded. Thus, the initial packet from an endpoint device or a gateway routing device is discarded. However, because the IP layer does not guarantee packet delivery, typically, a higher layer protocol provides for error recovery and retries. Thus, such a discarded packet will typically be retransmitted after a several second recovery timeout. By the time a retry is performed, the ARP request and response will typically have completed. Therefore, a legitimate user's retransmitted packet would be forwarded as an ARP table entry would exist for the retransmitted packet. A zombie may also retransmit a packet. In such a case, the retransmitted packet would be discarded unless the zombie was infected in a manner which allowed it to respond to the ARP request indicating that it owned the source IP address, by for example, infecting the zombie's kernel, device driver, or ARP protocol. In any event, even if the spoofed packets are not eliminated, the timeout of the initial packet may significantly reduce the rate at which the zombie can inject spoofed packets on the network.

Optionally, the packets could be buffered until such time as a determination could be made as to whether the source MAC address was either associated with a routing device or bound to the source IP address at the source device. For example, the packets could be stored in a queue until a response to the ARP request was received or the ARP request had timed out. The results of the ARP request could then be used to determine if the MAC address was bound to the IP address at the source device or the physical address of a routing device utilizing the techniques as described herein.

An example of the operations illustrated in FIG. 6, assuming a current state of the routing table SP 175 and the ARP table 170 as illustrated above in Tables 1 and 2, will now be described. If the endpoint EA 140 sends a packet to the router RY 120 with a source MAC address of 00-20-35-86-63-42 and a source IP address of S1.EA, the router RY 120 would check its ARP table 170 for the MAC address 00-20-35-86-63-42 and not find it. As a result, the packet would be discarded and the router RY 120 would send an ARP request to the IP address S1.EA on the subnet S1 100. When the response was received from the endpoint EA 140, the router RY 120 would update its ARP table 170 to appear as reflected in Table 3 below: Table 3. ARP Table for S1.RY on Interface L1 After Receiving a Packet from EA

| IP Address | Physical Address |
|---|---|
| S1.EG | 00-20-35-86-6f-83 |
| S1.RX | 40-00-49-25-38-01 |
| S1.EA | 00-20-35-86-63-42 |

The next time a packet is received from the endpoint EA 140, the router RY 120 will find the MAC address in its ARP table 170 and, if the source IP address of the packet is S1.EA, forward the packet. If the source IP address is not S1.EA, the packet will be discarded.

Similarly, if a packet is received at the router RY 120 from the router RX 110 and the packet has a source MAC address of 40-00-49-25-38-01, the router RY 120 will find the MAC address in its ARP table 170 and determine that the source MAC address is associated with a router. The packet will, therefore, be forwarded.

Figure 7A:
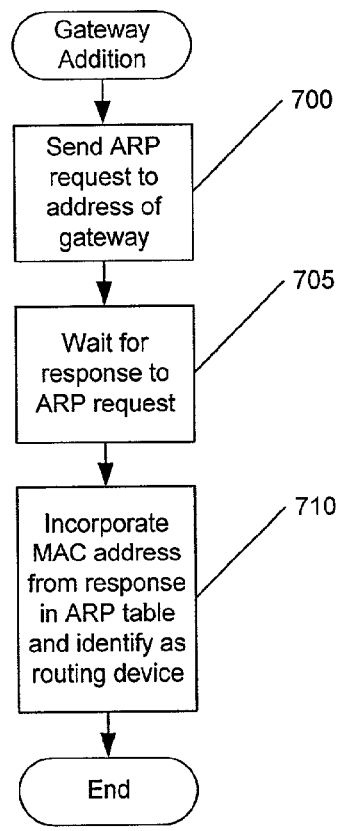
FIGS. 7A and 7B are flowcharts illustrating operations for determining if a network device is a routing device according to particular embodiments of the present invention.
Figure 7B:
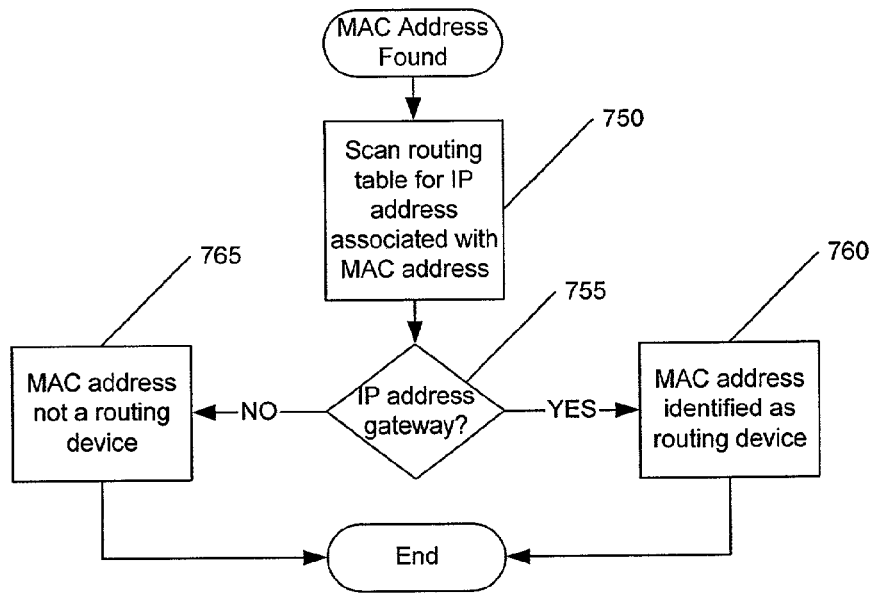

FIGS. 7A and 7B illustrate alternative embodiments for determining if a MAC address is a physical address of a router. As seen in FIG. 7A, when a device according to the embodiments of the present invention, such as the router RY 120 or monitor 220, detects or is notified of another router identified as a gateway routing device such that the gateway routing device is added to a routing table 175 or 275, an ARP request is sent to the IP address of the gateway routing device being added to the routing table 175, 275 (block 700). When a response is received to the ARP request (block 705), the MAC address from the response is incorporated as an entry in the ARP table 170, 270, 462 and the entry is identified as an entry corresponding to a routing device (block 710). In such embodiments, the determination of whether a MAC address is the physical address of a routing device, such as illustrated in block 520 of FIG. 5 and/or block 640 of FIG. 6, may be made by examining an entry in the ARP table 170, 270, 462 corresponding to the source MAC address of a packet to determine if it is identified as corresponding to a routing device.

FIG. 7B illustrates alternative embodiments for determining if a MAC address is a physical address of a routing device. Such operations may provide the determination of block 520 of FIG. 5 and/or block 640 of FIG. 6. As seen in FIG. 7B, when a MAC address of a packet is found in the ARP table 170, 270, 462, the routing table 175, 275 is scanned for an entry corresponding to the IP address of the ARP table entry (block 750). If a routing table entry is found, it is determined if the routing table entry is an entry for a gateway routing device (block 755). If so, the MAC address is identified as the physical address of a routing device (block 760). If the routing table entry is not an entry for a gateway routing device (block 755), the MAC address is not identified as a physical address of a routing device (block 765). An example of operations for determining if a packet is from a router, assuming the ARP table 170 of Table 2 and the routing table 175 of Table 1 will now be described. When the router RY 120 receives notification that a device, such as the router RZ 130, is established as a gateway to another subnet, such as subnet S3, according to the embodiments illustrated in FIG. 7A, the router RY 120 sends an ARP request to the IP address of the gateway routing device. In the present example, the IP address would be S1.RZ. When the router RY 120 receives the response to the ARP request it creates an entry in the ARP table 170 corresponding to the response and identifies it as a router. Thus, the ARP table would be updated as reflected in Table 4:

Table 4. ARP Table for S1.RY on Interface L1 After RZ Registers

| IP Address | Physical Address |
| --- | --- |
| S1.EG | 00-20-35-86-6f-83 |
| S1.RX | 40-00-49-25-38-01 |
| S1.EA | 00-20-35-86-63-42 |
| S1.RZ | 40-00-49-25-38-03 |

When a subsequent packet with the source MAC address of 40-00-49-25-38-03 is received, it will be identified as a packet from a router and be forwarded.

As an example of the alternative embodiments illustrated in FIG. 7B, assuming the ARP table 170 of Table 2 and the routing table 175 of Table 1, when the router RY 120 receives notification that a device, such as the router RZ 130 is established as a gateway to another subnet, such as subnet S3, the router RY 120 updates its routing table 175 to incorporate the new gateway information. Thus, the routing table would be revised as reflected in Table 5:

Table 5. Updated Routing Table

| Subnet | Gateway IP Address |
| --- | --- |
| S1 | S1.RY |
| S2 | S1.RX |
| S3 | S1.RZ |
| S4 | S1.RX |

Furthermore, because no entry exists for the MAC address of the router RZ 130 in the ARP table 170, the router RY 120 also sends an ARP request to the IP address of the gateway routing device, in the present example, the IP address would be S1.RZ. When the router RY 120 receives the response, it creates an entry in the ARP table 170 corresponding to the response. Thus, the ARP table 170 would be updated as reflected in Table 4 above.

When a packet is received, the source MAC address of the packet would be located in the ARP table 170. Thus, if a packet is received from the router RZ 130, the MAC address 40-00-49-25-38-03 would be located and found to correspond to IP address S1.RZ. The routing table 175 would then be searched for router entries having an IP address of S1.RZ and an entry would be found. Accordingly, in the present example, the packet would be identified as from a router. If no entry was found, the packet would be identified as not from a router and the comparison of the source IP address of the packet to the IP address of the ARP table entry would be performed.

Figure 8:
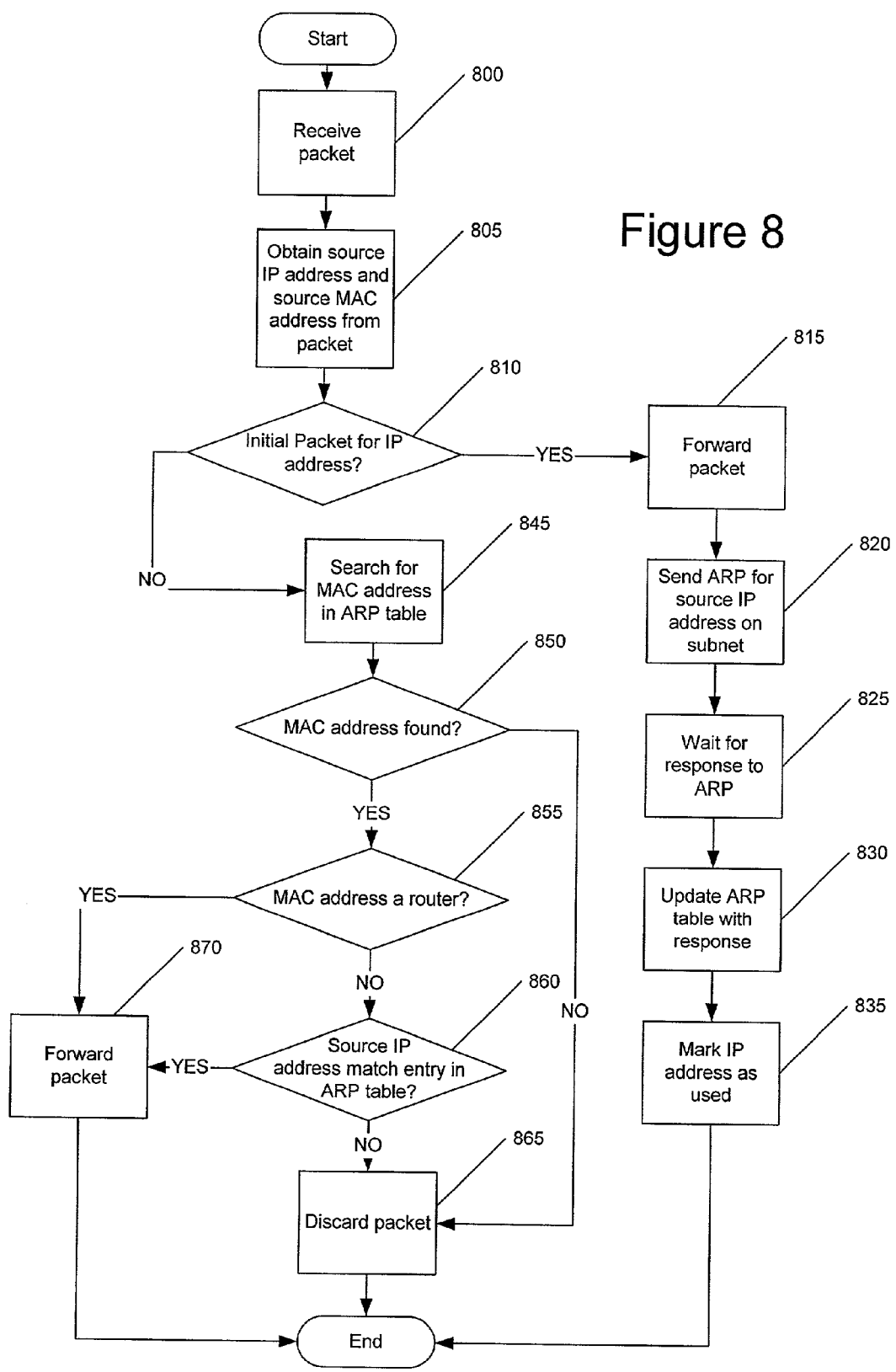
FIG. 8 is a flowchart illustrating operations according to further embodiments of the present invention which forward initial packets.

FIG. 8 illustrates further embodiments of the present invention where the initial packet is forwarded even if no MAC address exists in the ARP table 170. As with the previous embodiments, a packet is received at a routing device, such as the router RY 120 (block 800) and the source IP address and the source MAC address are obtained from the received packet (block 805). It is determined if the packet is an initial packet for the source IP address (block 810). Such a determination may be made by, for example, maintaining a list of IP addresses for which an ARP request has previously been transmitted. If the source IP address is not found in the list, the packet would be considered an initial packet for the source IP address. Optionally, the list could be based on both the source IP address and the source MAC address, such that the determination of whether the packet is an initial packet is made based on the source IP address, source MAC address tuple. Such an embodiment may allow forwarding of packets from a legitimate user even if the IP address of the legitimate user has been spoofed by another device.

If the packet is an initial packet for the source IP address (block 810), the packet is forwarded (block 815) and an ARP request sent to the source IP address of the packet (block 820) and the routing device waits for a response (block 825). If a response is received, the ARP table 170 is updated with the IP address and the MAC address (block 830). In any event, the source IP address is identified as "used" (block 835) by, for example, updating the above described list of IP address for which an ARP request has been transmitted.

Returning to block 810, if the packet is not an initial packet for the source IP address, the ARP table 170 is searched for entries corresponding to the source MAC address (block 845). If no entry is found in the ARP table 170 which correspond to the source MAC address (block 850), the packet is discarded (block 865). If an entry or entries are found in the ARP table 170 corresponding to the MAC address (block 850), it is determined if the MAC address is the physical address of a router (block 855). If the MAC address is the physical address of a router (block 855), the packet is forwarded (block 870). If the MAC address is not the physical address of a router (block 855), it is determined if the source IP address matches an entry in the ARP table 170 corresponding to the source MAC address (block 860). If the source IP address matches an entry in the ARP table 170 corresponding to the source MAC address (block 860), the packet is forwarded (block 870). If the source IP address does not match an IP address of entry in the ARP table 170 corresponding to the source MAC address (block 860), the packet is discarded (block 865).

Figure 9:
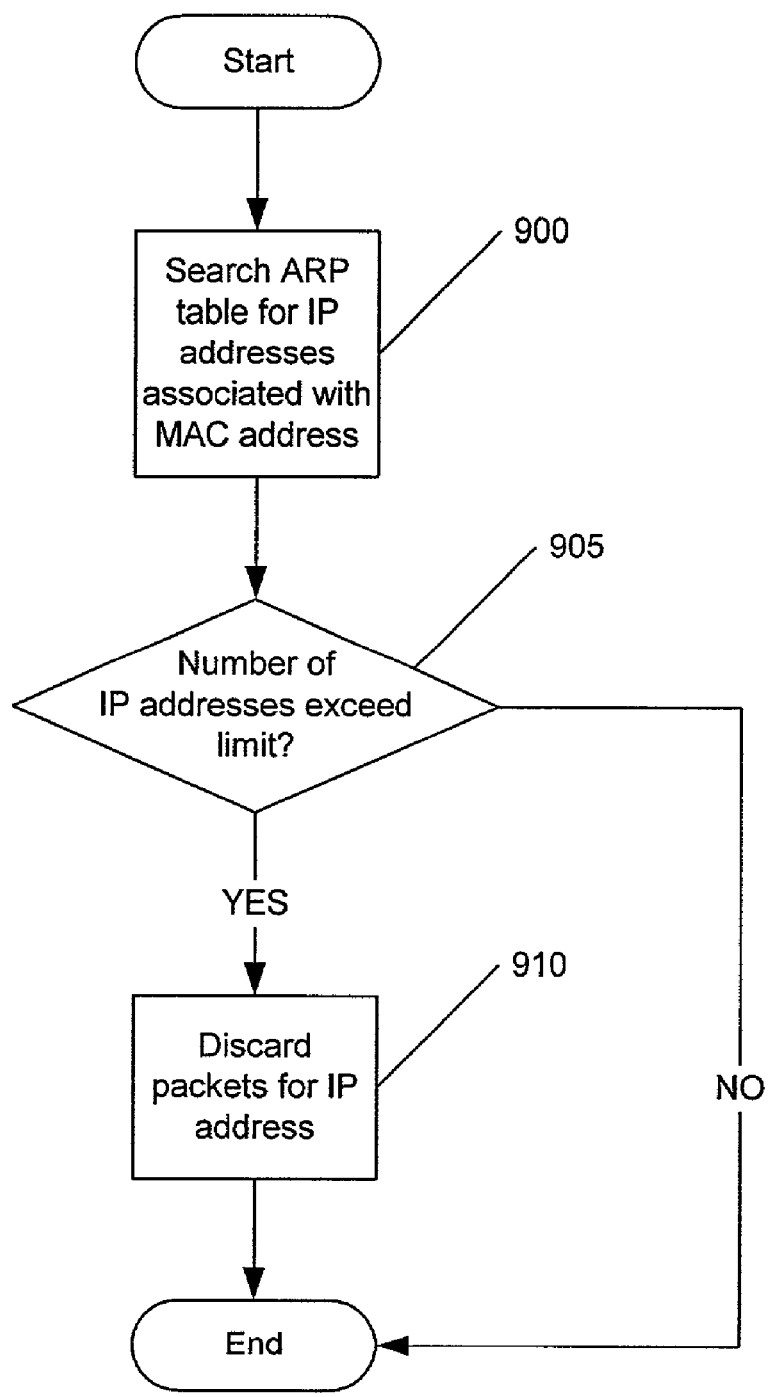
FIG. 9 is a flowchart illustrating operations according to further embodiments of the present invention which restrict IP addresses associated with an interface.

FIG. 9 illustrates further embodiments of the present invention where the number of IP addresses which are associated with a MAC address is limited to a predefined number. The limit may be common for all devices on a subnet or network or may be based on characteristics of an individual device. For example, devices which are known not to require multiple IP addresses could be limited to a single IP address. Thus, as seen in FIG. 9, a packet may be further processed by searching the ARP table 170, 270, 462 for IP addresses associated with the source MAC address of the packet (block 900). It may then be determined if the number of IP address associated with the source MAC address has exceeded the limit for the device or the network (block 905). If the number of IP address associated with the source MAC address exceeds the limit (block 905), this may indicate that the source device has been compromised and all packets from that device may be discarded (block 910). In monitoring embodiments of the present invention, if the number of IP address associated with the source MAC address exceeds the limit (block 905), a log entry could be made and/or an administrator notified of the condition so that corrective action could be carried out.

The operations of FIG. 9 may be incorporated in the previously described embodiments of the present invention. For example, the operations could be incorporated as part of blocks 845 and 850 of FIG. 8, blocks 610 and 615 of FIG. 6 or added to FIG. 5 after block 510. While not preventing spoofed packets, such a limitation may reduce the ability of a virus or other malicious or defective code to generate large amounts of spoofed packets with differing source IP addresses.

Figure 10:
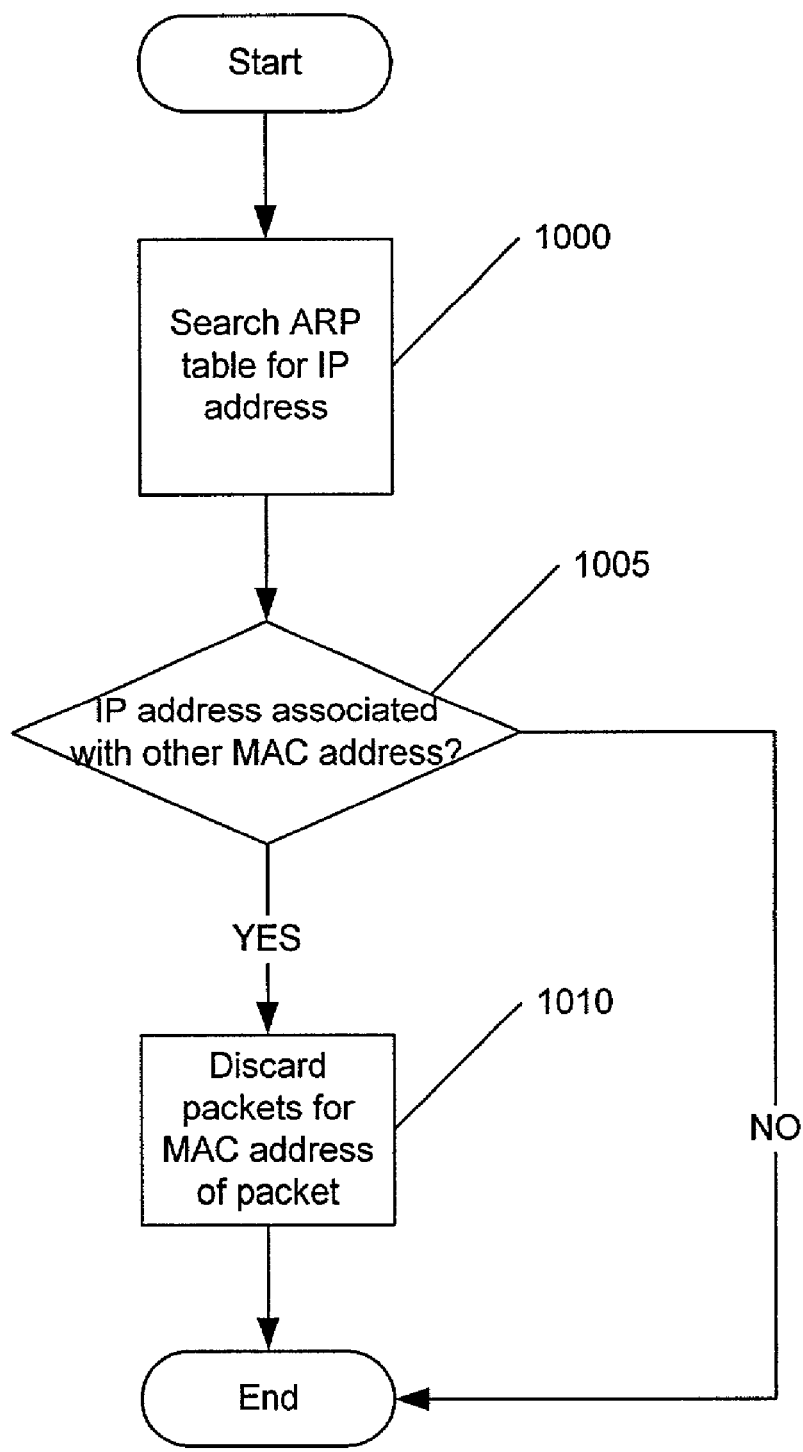
FIG. 10 is a flowchart illustrating operations according to further embodiments of the present invention which lock out interfaces that attempt to claim IP addresses already claimed by another interface.

FIG. 10 illustrates further embodiments of the present invention where packets from a device are discarded if a source IP address is associated with more than one MAC address. Thus, as seen in FIG. 10, a packet may be further processed by searching the ARP table 170, 270, 462 for entries corresponding to the source IP address of the packet (block 1000). The results of this search may be evaluated to determine if MAC addresses other than the source MAC address of the packet are associated with the source IP address (block 1005). If so, this may indicate that one of the source devices has been compromised and all packets from the source devices (i.e. packets with a source MAC address corresponding to the source MAC address of the packet being processed) may be discarded (block 1010). In monitoring embodiments of the present invention, if multiple MAC addresses are associated with a single IP address, a log entry could be made and/or an administrator notified of the condition so that corrective action could be taken.

The operations of FIG. 10 maybe incorporated in the previously described embodiments of the present invention. For example, the operations could be incorporated as part of blocks 845 and 850 of FIG. 8, blocks 610 and 615 of FIG. 6 or added to FIG. 5 after block 510. While not preventing entirely spoofed packets, such a limitation may reduce the ability of a virus or other malicious or defective code to generate large amounts of spoofed packets with differing source IP addresses.

Figure 11:
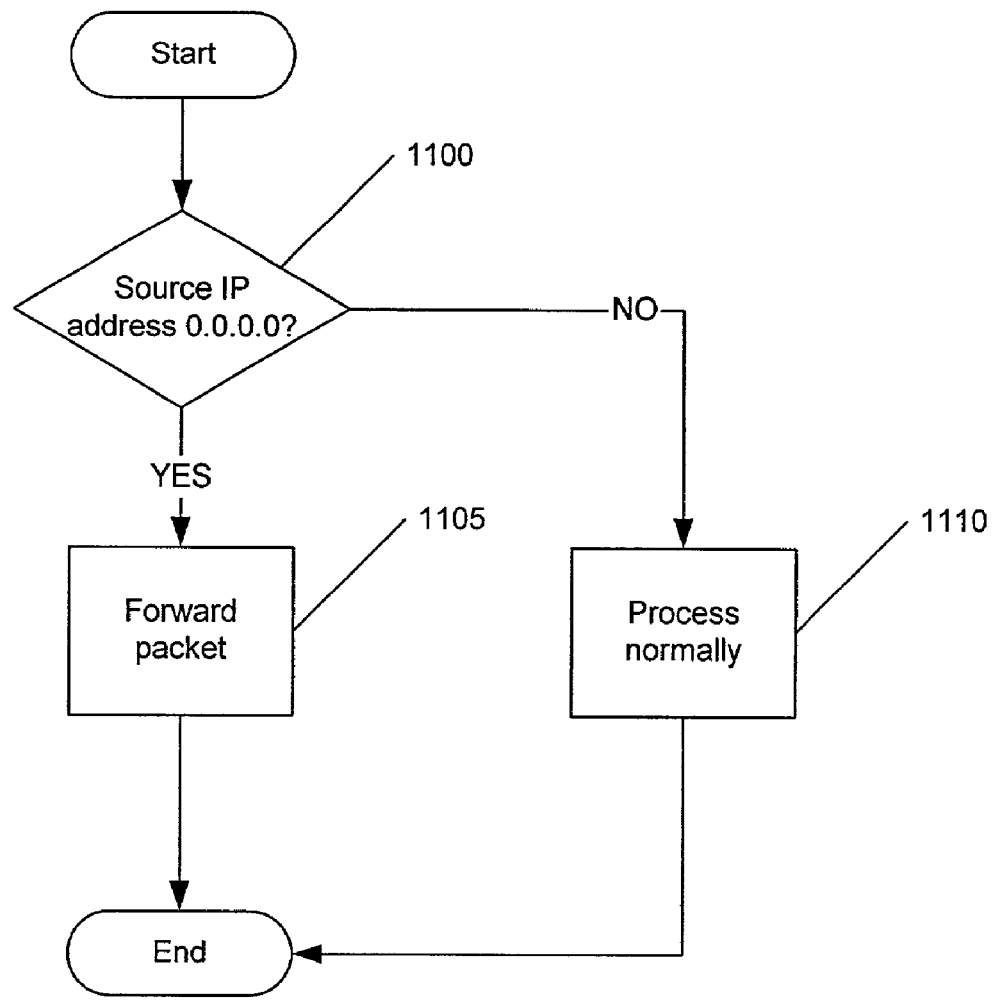
FIG. 11 is a flowchart illustrating operations according to embodiments of the present invention suitable for use in systems incorporating the Dynamic Host Configuration Protocol (DHCP).

FIG. 11 illustrates operations of further embodiments of the present invention which are suitable for use in systems utilizing DHCP. As seen in FIG. 11, the packet may be further processed to determine if the source IP address of the packet is 0.0.0.0 (block 1100). If the source IP address is 0.0.0.0 (block 1100), the packet may be assumed to be a DHCP request and the packet is forwarded (block 1105). If the source IP address is not 0.0.0.0 (block 1100), the packet is processed as otherwise described above (block 1110). The operations of FIG. 11 may be incorporated in the previously described embodiments of the present invention. For example, the operations could be incorporated as part of block 810 of FIG. 8, blocks 610 and 615 of FIG. 6 or added to FIG. 5 after block 510. The operations of FIG. 11 may further include verification of the contents of the packet so as to assure that the contents are a DHCP request. Such a verification may further assure that the packet is legitimate.

As used herein, forwarding the packet may refer to forwarding the packet to another device or forwarding the packet to another protocol layer on a single device. For example, a packet may be forwarded to the IP layer of a device for processing or discarded prior to the packet being provided to the IP layer. Furthermore, for clarity, the embodiments of the present invention have been described without reference to subnet masks or multiple subnets per interface. As will be appreciated by those of skill in the art in light of the present disclosure, preferably, subnets masks are utilized in evaluation of the IP addresses. Furthermore, multiple subnets may be provided for a single interface or multiple interfaces may be provided for a single device while still incorporating the teachings of the present invention.

As described above, embodiments of the present invention may utilize routing layer and layer 2 information to determine if a packet may contain a spoofed source IP address. In particular, the information provided by the routing layer as to which devices are routing devices may be utilized to allow forwarding of packets from a routing device while selectively blocking packets from endpoint devices. As such, it is preferred that the routing protocol be a secure routing protocol. However, embodiments of the present invention may still be beneficially utilized even if a secure routing protocol is not employed as the difficulty of creating a virus which performs a DOS attack may be increased.

As will be appreciated from the above discussion, embodiments of the present invention may detect a DOS attack and/or reduce the impact that a DOS attack may have on a network or related networks. Such may be particularly beneficial as network attached devices, such as network attached storage, become more prevalent. For example, the availability of a network attached storage device may be increased by placing the device on a separate subnet and providing access to the device from a router incorporating embodiments of the present invention. In such a configuration, the network attached storage device could be shielded from DOS attacks originating on another subnet. Thus, if multiple subnets share a network attached storage device, the availability of the device may be increased. Alternatively, the filtering of the present invention could be provided as part of the network attached storage device such that packets would be selectively forwarded to the IP layer of the device. In such a case, utilization of the resources of the device may be shielded from the effects of a DOS attack.

As will be appreciated by those of skill in the art in light of the present disclosure, the embodiments illustrated in FIGS. 1 through 11 may provide new methods of doing business. In particular, the methods of doing business may be provided to monitor packets on a network and detect packets with spoofed IP addresses so as to, either automatically or through user or administrator intervention, avoid or reduce the impact of DOS attacks by taking corrective action.

The flowcharts and block diagrams of FIGS. 1 through 11 illustrate the architecture, functionality, and operation of possible implementations of systems, methods and computer program products according to various embodiments of the present invention. In this regard, each block in the flow charts or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be understood that each block of the block diagrams and/or flowchart illustrations, and combinations of blocks in the block diagrams and/or flowchart illustrations, can be implemented by special purpose hardware-based systems which perform the specified functions or acts, or combinations of special purpose hardware and computer instructions.

In the drawings and specification, there have been disclosed typical illustrative embodiments of the invention and, although specific terms are employed, they are used in a generic and descriptive sense only and not for purposes of limitation, the scope of the invention being set forth in the following claims.

That which is claimed is:

1. A method of determining if a packet has a spoofed source Internet Protocol (IP) address, comprising:
   evaluating a source media access control (MAC) address of the packet and the source IP address to determine if the source IP address of the packet has been bound to the source MAC address at a source device of the packet; and
   determining that the source IP address is spoofed if the source IP address is not bound to the source MAC address and the source MAC address is not associated with a gateway routing device,
   wherein evaluating a source MAC address of the packet and the source IP address further comprises:
   identifying an entry in an address resolution protocol (ARP) table corresponding to the source MAC address;
   comparing an IP address of the identified entry to the source IP address to determine if the IP address of the identified entry corresponds to the source IP address;
   identifying the source IP address as bound to the source MAC address at the source device if the IP address of the identified entry corresponds to the source IP address;
   sending an ARP request to the source IP address if no entry in the ARP table is identified as corresponding to the source MAC address; and
   incorporating an entry corresponding to the MAC address into the ARP table if a response is received to the ARP request.

2. The method of claim 1, further comprising:
   determining if the source MAC address is identified in an ARP table as a MAC address of a routing device to determine if the source MAC address is associated with a gateway routing device.

3. The method of claim 2, wherein determining if the source MAC address is identified in an ARP table is preceded by:
   determining if an IP address of a gateway routing device is to be added to a routing table;
   sending an ARP request to the IP address of the gateway routing device;
   receiving a response to the ARP request that identifies a MAC address of the gateway routing device;
   updating the ARP table with the MAC address of the gateway routing device; and
   identifying the MAC address in the ARP table as associated with a gateway routing device.

4. The method of claim 1, further comprising:
   determining IP addresses associated with the source MAC address in an ARP table;
   determining if the IP addresses associated with the source MAC address in the ARP table are associated with a gateway routing device to determine if the source MAC address is associated with a gateway routing device; and
   determining that the source IP address is not spoofed if the source MAC address is associated with a gateway routing device.

5. The method of claim 4, wherein determining if the IP addresses associated with the source MAC address in the ARP table are associated with a gateway routing device comprises searching a routing table for the IP addresses to determine if any of the IP addresses are associated with a gateway routing device in the routing table to determine if the source MAC address is associated with a gateway routing device.

6. The method of claim 1, further comprising identifying the source IP address as not bound to the source MAC address if a response is not received to the ARP request.

7. The method of claim 1, further comprising discarding the packet if no entry in the ARP table corresponding to the MAC address has an IP address which corresponds to the source IP address.

8. The method of claim 7, further comprising logging MAC addresses of discarded packets.

9. The method of claim 7, wherein a destination device of the packet comprises a network attached storage device and wherein discarding the packet if no entry in the ARP table corresponding to the MAC address has an IP address which corresponds to the source IP address is carried out so that the packet is not forwarded to an Internet Protocol (IP) layer of the network attached storage device so as to increase the availability of the network attached storage device in the event of a denial of service attack.

10. The method of claim 1, further comprising:
    determining if the source IP address is associated with a routing device;
    forwarding the packet if the source IP address is associated with a routing device; and
    discarding the packet if the source IP address is not associated with a routing device and if no entry in the ARP table corresponding to the MAC address has an IP address which corresponds to the source IP address.

11. The method of claim 1, further comprising discarding the packet if the source MAC address is associated with more than a predefined number of IP addresses.

12. The method of claim 11, wherein the predefined number of IP addresses is associated with the source device.

13. The method of claim 11, wherein the predefined number of IP addresses is associated with a subnet associated with the MAC address.

14. A method of determining if a packet has a spoofed source Internet Protocol (IP) address, comprising:
  evaluating a source media access control (MAC) address of the packet and the source IP address to determine if the source IP address of the packet has been bound to the source MAC address at a source device of the packet;
  determining that the source IP address of the packet is spoofed if the source IP address is not bound to the source MAC address; and
  discarding the packet if the source IP address is associated with at least one MAC address other than the source MAC address,
  wherein evaluating a source MAC address of the packet and the source IP address further comprises:
  identifying an entry in an address resolution protocol (ARP) table corresponding to the source MAC address:
  comparing an IP address of the identified entry to the source IP address to determine if the IP address of the identified entry corresponds to the source IP address;
  identifying the source IP address as bound to the source MAC address at the source device if the IP address of the identified entry corresponds to the source IP address;
  sending an ARP request to the source IP address if no entry in the ARP table is identified as corresponding to the source MAC address; and
  incorporating an entry corresponding to the MAC address into the ARP table if a response is received to the ARP request.

15. The method of claim 14, further comprising forwarding the packet if the source IP address indicates that the packet is a dynamic host configuration protocol (DHCP) request.

16. The method of claim 15, wherein forwarding the packet comprises forwarding the packet if the source IP address indicates that the packet is a dynamic host configuration protocol (DHCP) request and the contents of the packet indicate that the packet is a DHCP request.

17. The method of claim 14, further comprising notifying a system administrator of a subnet of the source device and the presence of a spoofed source IP address in a packet from the source device when no entry in the ARP table corresponding to the MAC address has an IP address which corresponds to the source IP address.

18. A method of determining if a packet has a spoofed source Internet Protocol (IP) address, comprising:
  evaluating a source media access control (MAC) address of the packet and the source IP address to determine if the source IP address of the packet has been bound to the source MAC address at a source device of the packet;
  determining that the source IP address of the packet is spoofed if the source IP address is not bound to the source MAC address;
  monitoring packets from a source device to determine if the source device has more IP addresses bound to the MAC address of the source device than a predefined limit; and
  identifying the source device as having more IP addresses bound to its MAC address than the predefined limit so as to allow corrective action to be taken to reduce network degradation as a result of a denial of service attack utilizing the spoofed source IP address bound to the MAC address of the source device,
  wherein evaluating a source MAC address of the packet and the source IP address further comprises:
  identifying an entry in an address resolution protocol (ARP) table corresponding to the source MAC address;
  comparing an IP address of the identified entry to the source IP address to determine if the IP address of the identified entry corresponds to the source IP address;
  identifying the source IP address as bound to the source MAC address at the source device if the IP address of the identified entry corresponds to the source IP address;
  sending an ARP request to the source IP address if no entry in the ARP table is identified as corresponding to the source MAC address; and
  incorporating an entry corresponding to the MAC address into the ARP table if a response is received to the ARP request, and
  wherein the corrective action to be taken to reduce network degradation as a result of a denial of service attack utilizing the spoofed source IP address bound to the MAC address of the source device comprises discarding packets from the source device and notifying a system administrator that the source has more IP address bound to its MAC address than the predefined limit.

19. The method of claim 18, further comprising establishing the predefined limit based on characteristics of the source device.

20. The method of claim 18, further comprising establishing the predefined limit as a common limit for all devices on a subnet of the source device.

21. A method of determining if a packet has a spoofed source Internet Protocol (IP) address, comprising:
  evaluating a source media access control (MAC) address of the packet and the source IP address to determine if the source IP address of the packet has been bound to the source MAC address at a source device of the packet;
  determining that the source IP address of the packet is spoofed if the source IP address is not bound to the source MAC address;
  determining if a source IP address is bound to a MAC address of more than one source device; and
  identifying the source devices having the IP address bound to the MAC addresses so as to allow corrective action to be taken to reduce network degradation as a result of a denial of service attack utilizing the spoofed source IP address bound to the MAC addresses of the source devices,
  wherein evaluating a source MAC address of the packet and the source IP address further comprises:
  identifying an entry in an address resolution protocol (ARP) table corresponding to the source MAC address:
  comparing an IP address of the identified entry to the source IP address to determine if the IP address of the identified entry corresponds to the source IP address;
  identifying the source IP address as bound to the source MAC address at the source device if the IP address of the identified entry corresponds to the source IP address;

sending an ARP request to the source IP address if no entry in the ARP table is identified as corresponding to the source MAC address; and incorporating an entry corresponding to the MAC address into the ARP table if a response is received to the ARP request.

22. The method of claim 21, wherein the corrective action to be taken to reduce network degradation as a result of a denial of service attack utilizing the spoofed source IP address bound to the MAC addresses of the source devices comprises discarding packets from the source device.

23. The method of claim 21, wherein the corrective action to be taken to reduce network degradation as a result of a denial of service attack utilizing the spoofed source IP address bound to the MAC addresses of the source devices comprises notifying a system administrator that the IP address is bound to MAC addresses of more than one source device.

* * * * *